(No Model.)
G. LATZ.
SAFETY FENDER FOR CARS.
No. 498,556. Patented May 30, 1893.
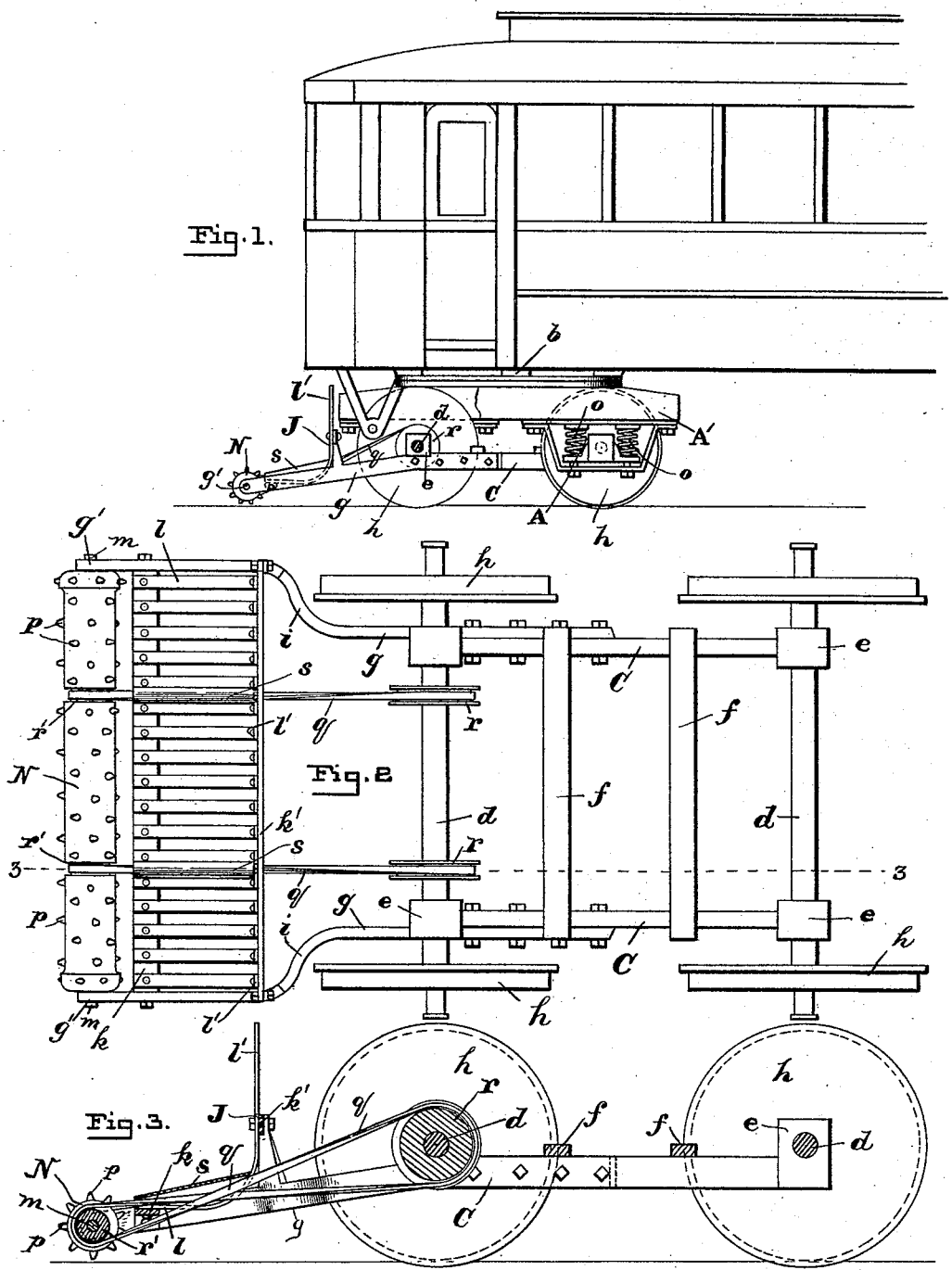

UNITED STATES PATENT OFFICE.

GEORGE LATZ, OF BALTIMORE, MARYLAND.

SAFETY-FENDER FOR CARS.

SPECIFICATION forming part of Letters Patent No. 498,556, dated May 30, 1893.

Application filed January 3, 1893. Serial No. 457,105. (No model.)

*To all whom it may concern:*

Be it known that I, GEORGE LATZ, a citizen of the United States, residing at Baltimore, in the State of Maryland, have invented certain new and useful Improvements in Safety-Fenders for Cars, of which the following is a specification.

This invention relates to an improved fender for street cars, to prevent persons, who may be on the track, from getting under the wheels. The fender is therefore a safety device.

The invention is illustrated in the accompanying drawings in which—

Figure 1 is a side view of the front end of a street car showing my improved safety fender. Fig. 2 is a plan view on a larger scale of the safety fender, the wheels of the front truck, and the means of attaching the fender to the same. Fig. 3 is a longitudinal section of the parts shown in Fig. 2.

This improved safety fender may be applied to street cars propelled by any motive power, such as electric or cable.

The truck, A, of the car is pivoted or swiveled at, b, in the usual manner, the upper part, A', of the truck is not shown in Fig. 2, but is removed to show the manner of attaching the fender. Two longitudinal bars, C, extend below the two axles, d, to which they are attached by suitable clips or boxes, e, these bars are inside of the wheel, h; two cross-beams, f, connect the two bars; these cross-beams when used in a cable car are to support the grip devices. Two arms, g, one at each side, are attached to the said longitudinal bars, C, on the truck and project forward in front of and below the car-body. Each arm has a lateral outward bend, i, in front of the wheel, h, thus the forward ends of the arms are separated by a greater distance than the rear ends attached to the bars, C; a bracket-fender, J, is supported by said arms at their forward ends. This bracket fender consists of cross-bars, k, k', to which are secured curved slat bars, l, which are bent at right angles to form a horizontal platform over the cross-bar, k, and also a vertical wall or fender, l', in front of the truck and below the car-body. The two supporting arms, g, extend forward beyond the horizontal platform and said extended ends have bearings, g', for the journals, m, of the roller, N; it will thus be seen I provide a horizontal platform and a roller at the front edge of said platform and both platform and roller, when the car is in motion, maintain constantly the same relative height above the rails of the track, the said height not being affected by the weight of the load in the car, for the reason that the supporting arms, g, of the platform and roller are mounted on the axles, while the car-body is mounted on the upper part, A', of the truck which is on springs o. This roller may be made of wood or metal, solid or hollow like a tube, and is provided on its surface with flexible or elastic knubs or short fingers, p. The roller is made to revolve in a reverse direction from the revolution of the wheels, by means of two belts, q, which run on pulleys, r, mounted on the axles and pulleys, r', on the roller,—the belt being crossed to give to the roller the desired direction of revolution.

The fender platform has two shields, s, to cover the belts, q, and thereby keep the running belts from contact with any body who may be lying on the platform.

The flexible or elastic knubs, p, may be attached to the roller in any preferred way; one way is to have sheet-rubber provided with these knubs, p, and partly vulcanized so as to have the sheet and the knubs flexible. The sheet may then be wound or wrapped around the roller thus leaving the knubs projecting.

The action of this safety fender will be understood from what has been stated. It is always at the same height from the car-track regardless of the load in the car; it is carried by the truck and not the car-body; the flexible and elastic knubs on the roller will greatly assist to lodge a person, who may be falling or who may be knocked over, on the platform part of the fender,—thus the roller with flexible knubs co-acts with the said platform. When a person knocked over has landed on the platform the vertical wall, l', will prevent him from passing backward under the car or under the truck; it is therefore a safety fender.

Having described my invention, what I claim as new, and desire to secure by Letters Patent, is—

In a safety fender for street cars, the combination of the vehicle axles, d; two longitudinal bars, C, of the truck attached to the axles;

the horizontal supporting arms, g, secured to the said longitudinal bars and inside the car-wheels,—each of said arms having an outward bend, i, to give a greater width between the forward ends; a bracket-fender, J, secured to the supporting arms, said fender comprising cross-bars, k, k', and curved slat-bars, l, secured thereto; a roller, N, rotating in bearings, g', in the forward ends of the supporting arms; a drive-chain, q, directly connecting the axle and said roller; and a shield, S, on the fender and covering the drive-chain, substantially as described.

In testimony whereof I affix my signature in the presence of two witnesses.

GEORGE LATZ.

Witnesses:
G. W. S. MUSGRAVE,
LOUIS W. RHODRICK.